Dec. 25, 1962 K. M. BRYMAN 3,070,324
PORTABLE WIRE REELING DEVICE
Filed Jan. 26, 1959
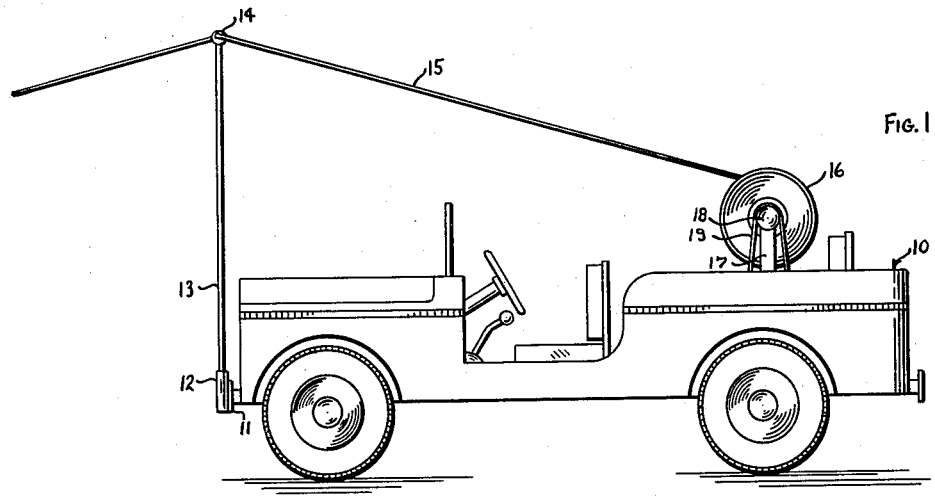
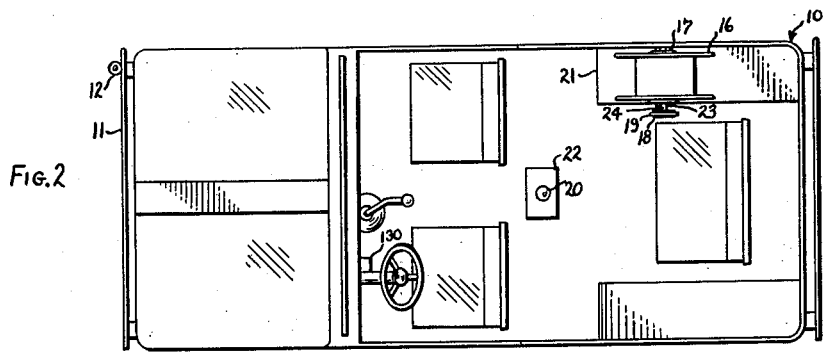
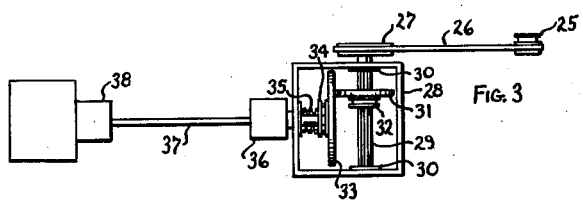
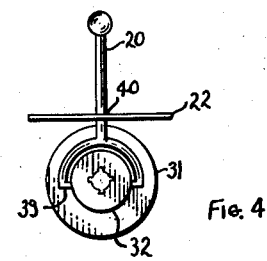
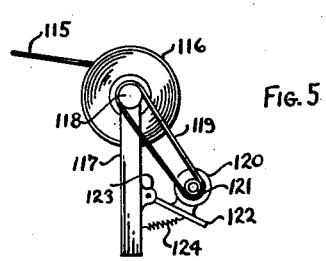
*INVENTOR.*
KINGSLEY M. BRYMAN
BY
*Charles L. Loveland*
ATTORNEY

3,070,324
PORTABLE WIRE REELING DEVICE
Kingsley M. Bryman, 21 Maple Drive, Edinboro, Pa.
Filed Jan. 26, 1959, Ser. No. 788,841
1 Claim. (Cl. 242—86.5)

This invention relates to reeling machines and, more particularly, to machines to reel and unreel wire for communicating purposes and the like; for example, during military operations.

In modern warfare, it is necessary to utilize telephones for communication because any radio communications can immediately be detected by the enemy with modern detection devices. Often, a communication line must be laid and later picked up. No efficient reeling means has heretofore been provided for laying and taking up telephone wires.

It is, accordingly, an object of this invention to provide an improved winding and reeling machine.

Another object of the invention is to provide an improved machine for reeling wire which will be mounted on a vehicle.

A further object of the invention is to provide an improved machine which will wind and reel wire with a predetermined tension.

A still further object of the invention is to provide a winding and reeling machine which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

FIG. 1 is a side view of a machine according to the invention;

FIG. 2 is a top view of the machine shown in FIG. 1;

FIG. 3 is a top view of the clutch box with the top thereof removed;

FIG. 4 is a view showing the method of mounting the control box according to the invention; and FIG. 5 is a side view of another embodiment of the invention with an electric motor for supplying the power.

Now with more particular reference to the drawing, FIGS. 1, 2, 3, and 4 show an embodiment of the invention with a jeep 10 as the means to drive a power driven communication wire reel 16. The communication wire 15 is retrieved and wound onto the communication wire reel 16 by activating outwardly an adjustable speed disk 31 with a clutch lever 20. The power to perform this function is derived from a power take-off 38 from the engine.

Persons familiar with jeeps of the military variety know that such jeeps have a transmission which connects the motor to two shafts which are connected in parallel. One of the shafts drives the ground engaging wheels of the vehicle while the other shaft is connected to a power take-off. This power take-off may be used to drive a hydraulic system or other attachment. In this case, the power take-off 38 is connected to the shaft 37 and thence to a universal joint 36 and, from there, to the clutch for driving the reel. A pressure spring 35 is held in place and away from a spinning friction power disk 33 by means of a bearing 34 which is fixed to the friction power disk 33. The constant pressure which is exerted on the bearing 34 forces the friction power disk 33 outwardly and against the adjustable speed disk 31. By moving the clutch lever 20 to the left, a pivot 40 in a clutch lever support plate 22 will force lever lugs 39 to the right.

The lever lugs 39 ride in a grooved guide 32 which is bolted to the adjustable speed disk 31. Therefore, by moving the adjustable speed disk 31 to the right, the speed of the disk 31 increases. The speed decreases as the disk 31 reaches the center position. In this position, the speed of the disk 31 is zero and thereby forms a neutral position. When the adjustable speed disk 31 is moved to the left, the output is driven in a reverse direction.

The adjustable speed disk 31 and the grooved guide 32 receive a splined shaft 29 mounted in bearings 30 located in the sides of the clutch box. The splined shaft 29 is received in a clutch box pulley 27. Riding on the pulley 27 is a V-belt 26 which connects with an intermediate pulley 25. A V-belt 19 connects the intermediate pulley 25 and a reel pulley 18. The communication wire reel 16 has a keyed shaft 24 which is also fixed to the reel pulley 18. The communication wire 15 which is to be reeled or unreeled is fed onto the communication wire reel 16 through a Pike pole eyelet 14. The eyelet 14 is stationed at the top of a Pike pole 13 which fits into a socket 12 which is welded or bolted to a front bumper 11 of the jeep 10. The communication wire reel 16 is mounted on reel supports 17 by means of recessed slots 23 in the top of the reel supports 17 which receive the keyed shaft 24. The reel supports 17 are bolted to a right rear fender 21.

To reel wire with the device shown, it is only necessary to pass the wire 15 through the eyelet 14 and drive the jeep 10 in the direction of the wire 15. Since the reel 16 is driven faster than the forward speed of the jeep 10, there must be a slippage of the disk 31 and the force causing slippage keeps a tension on the wire 15. To unreel the wire 15, the jeep 10 is driven in the opposite direction.

The embodiment of the invention shown in FIG. 5 discloses another method of driving a communication wire reel 116. An electric motor 120 is bolted to a motor platform 122. The motor platform 122 is provided to a reel support 117 and pivoted and fastened in integral ear supports 123. A spring 124 which is fixed to the reel support 117 and the bottom of the motor platform 122 maintains a constant downwardly pulling pressure. This action swings a motor pulley 121 downwardly, thereby tightening a V-belt 119 on a reel pulley 118 and causing the communication wire reel 116 to retrieve the communication wire 115.

The foregoing specification sets forth the invention in its preferred practical forms but the structure shown is capable of modification with a range of equivalents without departing from the invention which is to be understood is broadly novel as is commensurate with the appended claim.

The embodiments of the invention in which an exclusive property or privilege is claimed are defined as follows.

I claim:

A reeling device comprising a land vehicle, said vehicle having an engine, drive wheels and a transmission connected to said engine, a drive shaft connecting said transmission to said drive wheels to drive them, an upwardly extending pole on the front part of said vehicle, an eyelet on said pole at the upper end thereof adapted to receive a wire therethrough, a reel on said vehicle to receive said wire, an infinitely variable transmission on said vehicle connected to said first mentioned transmission, and a second drive shaft connecting said infinitely variable transmission to said reel whereby the speed at which said reel is driven can be varied relative to the speed of said vehicle.

(References on following page)

References Cited in the file of this patent

UNITED STATES PATENTS

| | | |
|---|---|---|
| 342,702 | Malin | May 25, 1886 |
| 499,189 | Hill | June 6, 1893 |
| 684,946 | O'Donnell | Oct. 22, 1901 |
| 1,126,317 | Thompson | Jan. 26, 1915 |
| 1,514,148 | Forssblad | Nov. 4, 1924 |
| 1,739,938 | Barnett | Dec. 17, 1929 |
| 1,750,815 | Rix | Mar. 18, 1930 |
| 1,940,051 | Heath | Dec. 19, 1933 |
| 2,250,269 | Lockwood | July 22, 1941 |
| 2,455,377 | Maggiacomo | Dec. 7, 1948 |
| 2,501,390 | Jeffreys | Mar. 21, 1950 |
| 2,588,721 | Heller | Mar. 11, 1952 |
| 2,819,874 | Belec | Jan. 14, 1958 |

FOREIGN PATENTS

| | | |
|---|---|---|
| 714,887 | France | Sept. 14, 1931 |